Aug. 4, 1925.

R. A. GREENE

ROASTER

Filed Dec. 9, 1924

INVENTOR
Richard A Greene
BY
ATTORNEY

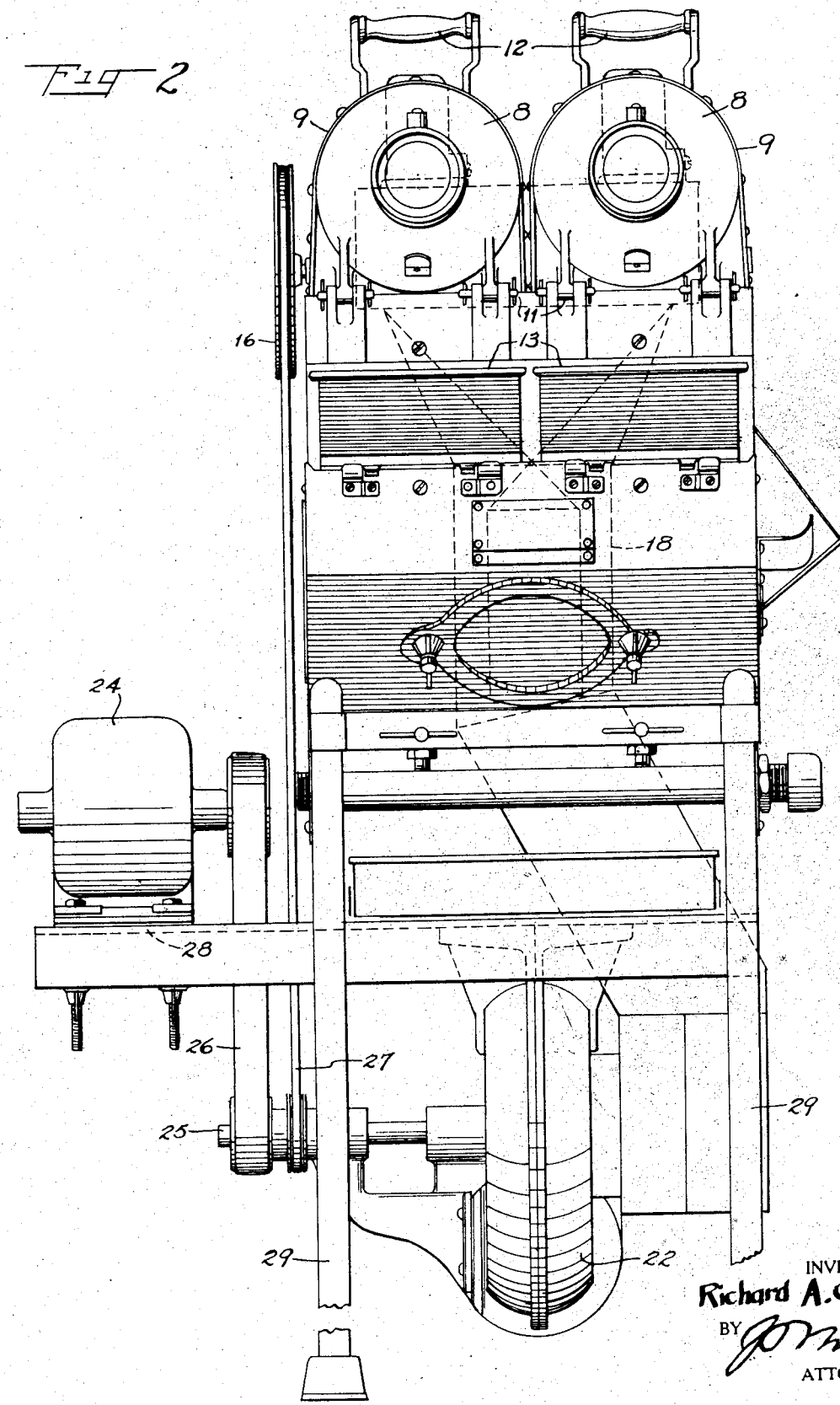

Aug. 4, 1925.　　　　　　　　　　　　　　　　　　　　1,548,036
R. A. GREENE
ROASTER
Filed Dec. 9, 1924　　　　　　3 Sheets-Sheet 3
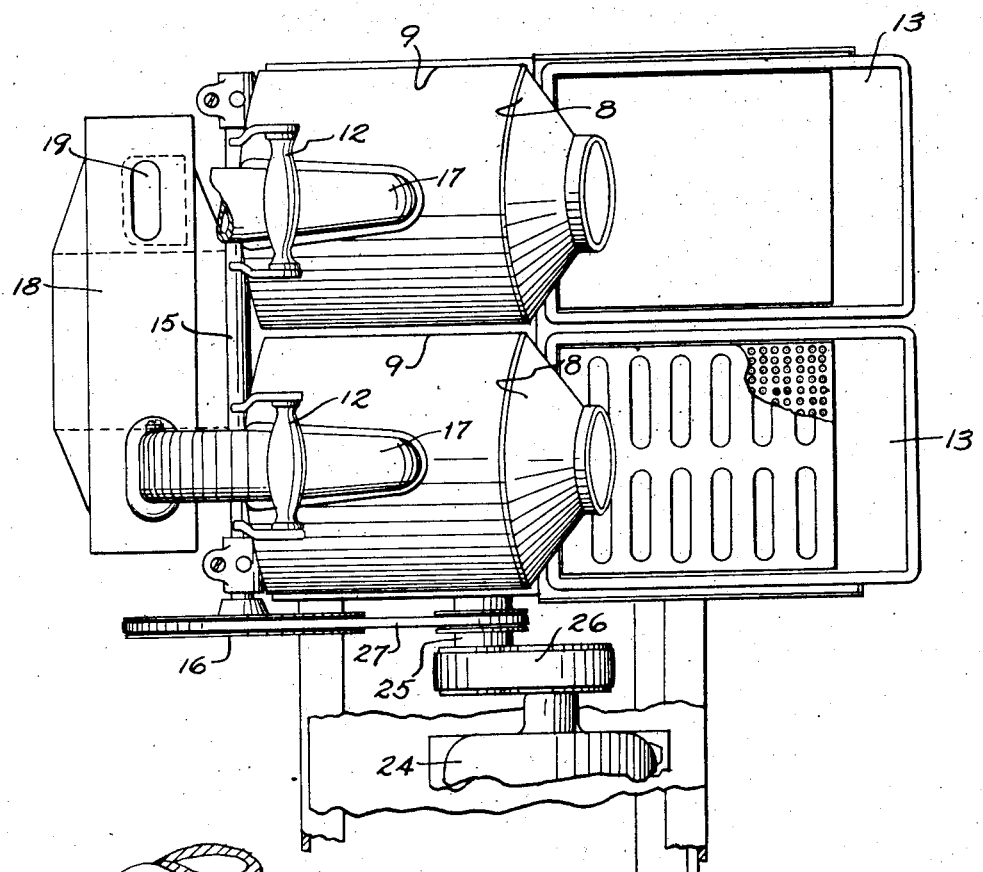
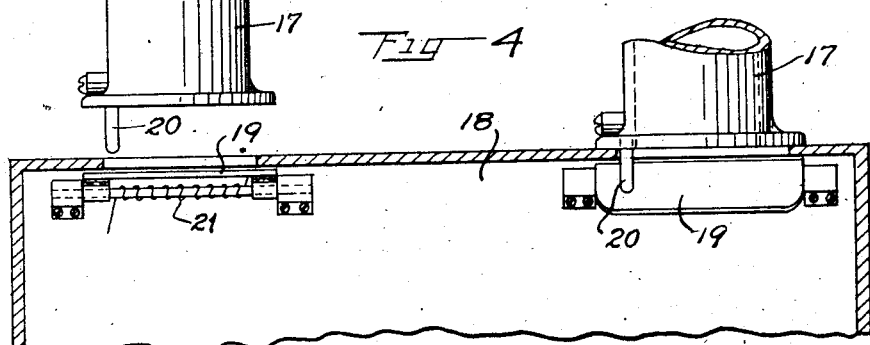
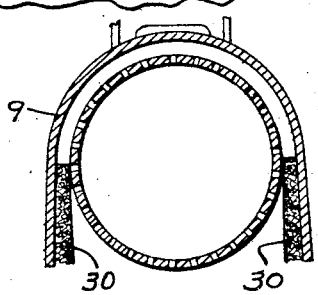
INVENTOR
Richard A. Greene
BY
ATTORNEY Patented Aug. 4, 1925.

1,548,036

UNITED STATES PATENT OFFICE.

RICHARD A. GREENE, OF BROOKLYN, NEW YORK, ASSIGNOR TO JABEZ BURNS & SONS, OF NEW YORK, N. Y., A CORPORATION OF NEW YORK.

ROASTER.

Application filed December 9, 1924. Serial No. 754,718.

*To all whom it may concern:*

Be it known that I, RICHARD A. GREENE, a citizen of the United States, and resident of Brooklyn, in the county of Kings and State of New York, have invented certain new and useful Improvements in Roasters, of which the following is a specification.

This invention relates to sample food product roasters and has for its object to increase the convenience of operation and prevent fumes, smoke, chaff, etc., from escaping into the room.

Sample roasters, for coffee and the like, have been built according to the patent to Burns, #932,957, dated August 31, 1909, wherein fumes, smoke, chaff, etc. escape from the roaster cylinder directly into the room. As such roasters are commonly arranged in multiple, a large quantity of fumes, smoke, chaff, etc. may thus escape if several are operated at once. In this patent, there is a common drive shaft for several cylinders or drums, the drive being disconnected when any drum is tilted forward to discharge the product into the pan or tray provided for the purpose of quickly cooling the product.

According to this invention, such type of machine is provided with exhaust means connected to each drum to draw off the fumes, smoke, chaff, etc. released, and a special feature and advantage of the invention is to so control the suction box as to have it in connection with several of the drums only when they are in operative position connected to the driving means, the suction being cut off automatically as any drum is disconnected from the drive shaft. The suction is produced by a fan which is preferably driven by the drum driving motor.

In the accompanying drawings:

Fig. 2 is a front view of the device of Fig. 1,

Fig. 3 is a top plan view of the device shown in Figs. 1 and 2,

Fig. 4 is an enlarged section through the suction box showing the automatic valve, and Fig. 5 is a transverse section on the line 5ᵃ—5ᵃ of Fig. 1.

Figure 1:
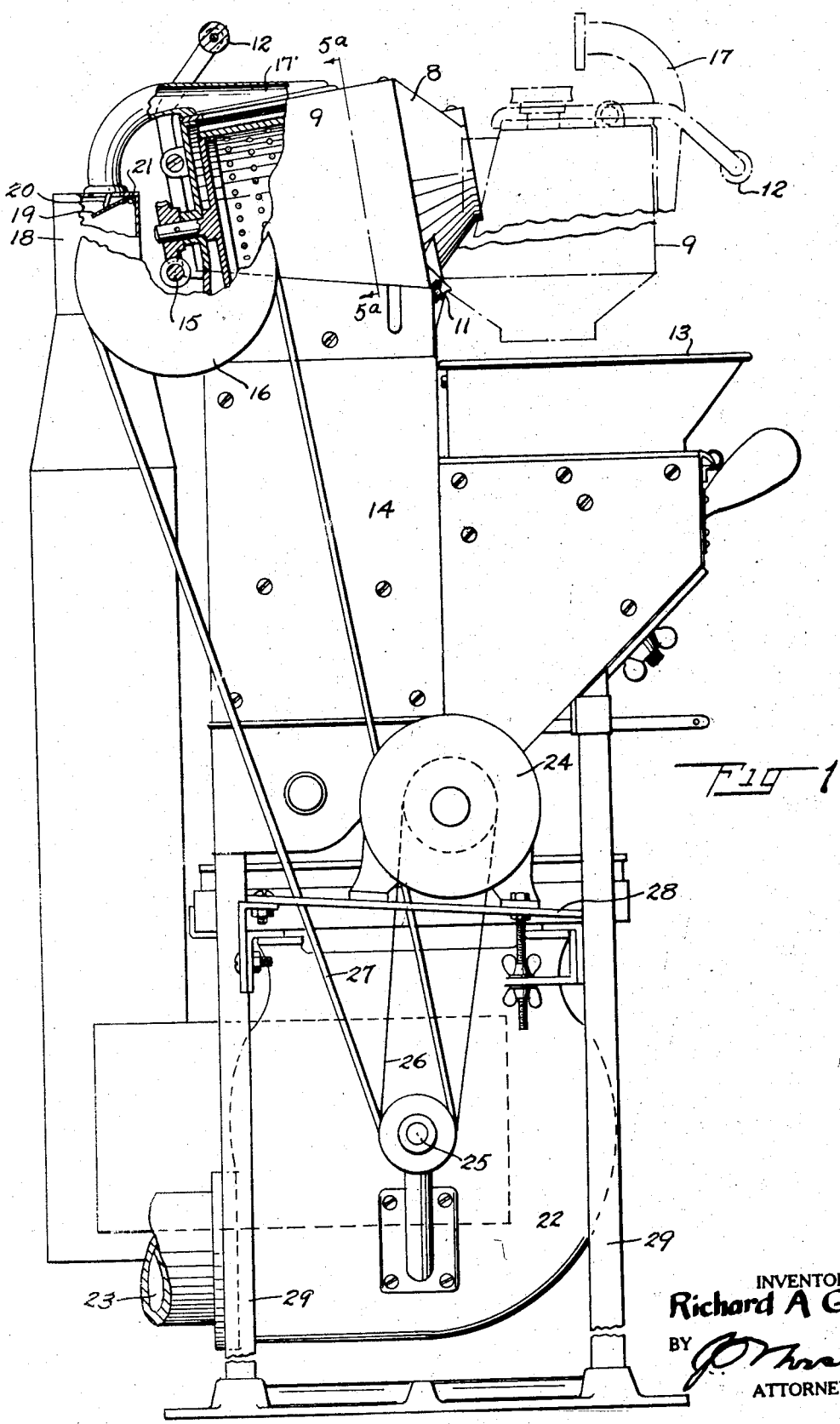
Fig. 1 is a side view of a roasting apparatus partly in section.

For purposes of illustration, two sample roasters 8 are shown arranged side by side, although it will be understood that any number of them can be arranged in a battery. Each roaster comprises the usual outer casing 9 and customary inner rotatable perforated drum or cylinder 10 such as shown, for example, in Patent #932,957 and is pivoted at 11 for dumping movement by the operator raising the handle 12 and swinging the roaster to a position shown in dotted lines in Fig. 1 when the coffee or other material is emptied in the tray 13. Within the casing 14 is arranged some form of burner or heating mechanism for the several roasters. Extending along the back of the roasters is the usual drive shaft 15 which may actuate the rotatable drums through some form of separable connection such as the worm drive illustrated, for example, in the prior Patent #932,957, but which specifically is not an essential of this invention. A pulley 16 or some other convenient mechanism drives the shaft 15.

The roaster casing is provided with an opening on top which connects with the suction passageway 17 leading rearwardly and downwardly as illustrated in Fig. 1, the passageway 17 being secured to and movable with the roaster casing. When the roaster is in operative position, the lower end of the passageway 17 engages the top of the suction box 18, a gasket being provided to prevent leakage at this connection. Within the suction box is the check valve 19 actuated by a projecting lug 20 at the end of the suction passageway 17, and pivoted at 21, where a spring wound around the pivot raises the valve to close the opening in the top of the suction box when the passageway 17 has been removed in dumping the roaster. Closing this valve when the roaster is dumped prevents the partial vacuum within the box 18 from being broken and thus enables the other roasters in the battery to continue their normal operation while one is being dumped. As shown by dotted lines in Fig. 2, the suction box leads down into the fan 22 and the outlet 23 from the fan may be led to a chaff separator and thence outdoors, or may pass directly out without using a chaff separator. A motor 24 drives the fan shaft 25 through the belt 26 and another belt 27 drives the pulley 16 from the fan shaft. The motor is mounted on an extension platform 28 projecting to one side of the bank of roasters as shown in Fig. 2 and attached to the supporting columns 29. As shown in Fig. 5, the inside of the casing is lined with an asbestos filler 30 up to about the height of the drum axis in order to lessen the space between the drum and casing and therefore enable most of the suction currents to be drawn through the perforated drum rather than between the drum and casing. The clearance at the rear of the drum between the casing end wall and the drum is relatively small. The absestos fits closely adjacent to the drum. From the foregoing description it will be apparent that the suction means may be connected with the drum in other ways than through the top of the stationary casing, as illustrated.

Among the advantages of this invention may be mentioned the freedom from smoke attained with one or any number of such roasters, the smoke and chaff being sucked out of the roasters and conducted outdoors instead of filling the room. By the arrangement of an automatically actuated valve in the suction box, it is possible to dump one of the roasters without interfering with the suction means for any of the others. The passage of air through the roaster provides better circulation and ventilation within the roaster drum or cylinder, removes the steam formed in the process of roastering and keeps the interior of the cylinder dryer; and quickens the time required for roasting and improves the quality of the product. While not usually necessary, the dumping outlet at the front of the roasters can be partially closed, if desired.

I claim:

1. In a roaster for coffee and the like, a rotatable drum, a casing around the drum, means to tilt the drum and casing in dumping the drum contents, and a suction means connected with the drum.

2. In a roaster for coffee and the like, a rotatable drum, a casing around the drum, means to tilt the drum and casing in dumping the drum contents, a separable driving mechanism for the drum, and a suction means connected with the drum when said driving mechanism is connected and disconnected when the driving mechanism is separated.

3. In a roaster for coffee and the like, a rotatable drum, separable driving means therefor, a suction box, a passageway connecting said drum and suction box, controlling means in said passageway for opening and closing the same, and means for actuating said controlling means to open said passageway when the driving means is operatively connected with said drum and to close said passageway when the driving means and drum are disconnected.

4. In a roaster for coffee and the like, a rotatable perforated drum, a casing around the drum, means to tilt the drum and casing in dumping the drum contents, a suction means connected with the casing and mechanism responsive to tilting of the casing for automatically controlling said suction means.

5. In a roaster for coffee and the like, a rotatable drum, a casing around the drum, means to tilt the drum and casing in dumping the drum contents, a separable driving mechanism for the drum, a separable suction means connected to the drum and mechanism for automatically disconnecting the drive mechanism and suction means in tilting and re-connecting the same on return of the casing and drum to operative position.

6. A plurality of roasters each comprising a rotatable drum, a casing around the drum, and means to tilt the drum and casing in dumping the drum contents, a suction means for the several roasters, and means to render the suction means inoperative in one roaster while dumping without affecting the operation of the suction means for the others.

7. A roaster comprising a rotatable drum and surrounding casing mounted for movement together in dumping, an exhaust passageway secured to said casing, a fixed passageway with which the first passageway engages when the roaster is in operative position, a valve within said fixed passageway, and means for actuating said valve responsive to movement of the drum and casing in dumping.

8. In a roaster for coffee and the like, a rotatable drum, a casing around the drum, means to tilt the drum and casing in dumping the drum contents out the front of the roaster, a separable suction means extending rearwardly from the roaster, and mechanism for disengaging said separable suction means in tilting.

9. A roaster comprising a rotatable drum and surrounding casing mounted for movement together in dumping, an exhaust passageway secured to said casing, a fixed passageway with which the first mentioned passageway engages when the roaster is in operative position, a spring actuated check valve within said fixed passageway, and a lug projecting from the end of the first mentioned passageway arranged to engage and open the valve on return of the casing to operative position after dumping.

10. A plurality of roasters each comprising a rotatable drum provided with a dumping opening at the front, a casing around each drum, a pivotal support at the front of each casing, a suction passageway leading rearwardly and downwardly from the top of each casing, a separable driving mechanism extending along the rear of said roasters, a fixed suction box to which the suction passageway of each roaster is connected, a fan in said suction box, means closing the connection of each suction passageway to the suction box when its roaster is being moved about the pivotal support for dumping, and a motor for actuating both the driving mechanism and fan.

11. In a roaster for coffee and the like, a rotatable perforated drum, a casing around the drum adjacent but spaced therefrom, means to tilt the drum and casing in dumping the drum contents, a suction means connected with the casing, and means for directing most of the suction currents through the drum.

12. In a roaster for coffee and the like, a rotatable perforated drum, a casing around the drum adjacent but spaced therefrom, means to tilt the drum and casing in dumping the drum contents, a suction means connected with the casing, and means including a filler between the drum and casing for directing most of the suction currents through the drum.

13. In a roaster for coffee and the like, a suction box provided with an intake opening with which a roaster is adapted to be connected, a valve controlling said opening, and means closing said valve when the suction box is disconnected from a roaster and yieldable to permit opening said valve when a roaster is connected with the box.

14. In a roaster for coffee and the like, a rotatable drum, means to tilt the drum in dumping, a suction box, means for driving the drum, means for disconnecting said drum from said suction box and said driving means in tilting, and means for connecting the suction box with the drum when the latter has returned to operative position from dumping.

Signed at New York city, in the county of New York and State of New York this 2d day of December A. D. 1924.

RICHARD A. GREENE.